United States Patent [19]

Ridenour et al.

[11] Patent Number: 4,871,199
[45] Date of Patent: Oct. 3, 1989

[54] DOUBLE BEAD TUBE FITTING

[76] Inventors: Ralph G. Ridenour, 626 Lexington-Ontario Rd., Rte. 12, Mansfield, Ohio 44903; Thomas Stanton, 921 Curtis Dr., Mansfield, Ohio 44906

[21] Appl. No.: 185,849

[22] Filed: Apr. 25, 1988

[51] Int. Cl.$^4$ ............................................. F16L 19/02
[52] U.S. Cl. ................................ 285/382.5; 285/384; 29/523
[58] Field of Search ................. 285/382, 382.4, 382.5, 285/382.7, 354, 369, 353, 384; 29/523

[56] References Cited

U.S. PATENT DOCUMENTS

| | | |
|---|---|---|
| 1,733,925 | 10/1929 | Weatherhead, Jr. ............... 285/382 |
| 1,961,453 | 6/1934 | Quarnstrom . |
| 2,522,195 | 9/1950 | Richardson ........................ 285/382 |
| 2,634,786 | 4/1959 | Stinchcomb et al. . |
| 2,779,279 | 1/1957 | Maiwurm . |
| 3,092,404 | 6/1963 | MacWilliams ..................... 285/382 |
| 3,195,936 | 7/1965 | Conder . |
| 3,665,591 | 5/1972 | Kowal . |
| 3,715,800 | 2/1973 | Leopold et al. . |
| 3,730,567 | 5/1973 | Webster . |
| 3,765,708 | 10/1973 | Pease et al. . |
| 3,778,090 | 12/1973 | Tobin . |
| 3,817,562 | 6/1974 | Cook et al. . |
| 4,240,774 | 12/1980 | Ladusaw .......................... 385/382.4 |
| 4,575,134 | 3/1986 | Sugano ............................. 285/382 |
| 4,682,832 | 7/1987 | Punako et al. ...................... 29/523 |

FOREIGN PATENT DOCUMENTS 27247 of 1915 United Kingdom ................ 285/382

Primary Examiner—Randolph A. Reese
Assistant Examiner—Anthony Knight
Attorney, Agent, or Firm—Pearne, Gordon, McCoy & Granger

[57] ABSTRACT

A tube fitting assembly includes a tube and first and second threaded fitting members with first and second lateral shoulders, respectively. A plurality of deformed areas, shown as two in number, are provided from the wall of the tube by axial compression. This establishes first and second beads with at least the second bead being an annular bead to cooperate with the second shoulder. When the two fitting members are threaded together, this axially compresses the plural beads so that a seal is formed between the second annular bead and the second shoulder on the second fitting member. The large extent to which the deformed areas may be axially compressed assures a good fluidtight seal despite the variable amount of torque applied to the fitting members. The foregoing abstract is merely a resume of one general application, is not a complete discussion of all principles of operation or applications, and is not to be construed as a limitation on the scope of the claimed subject matter.

18 Claims, 4 Drawing Sheets

DOUBLE BEAD TUBE FITTING

BACKGROUND OF THE INVENTION

A tube fitting commonly used in the prior art is one wherein a nut is slipped over the end of the tubing and then a sleeve with two conically tapered ends is slipped over the end of the tube. The tube end is then inserted in a second coupling member, which has an annular lateral shoulder therein at about a 45-degree angle to the tube axis. The nut or first fitting member also has about a 45-degree angle on an annular lateral shoulder, and as the two fitting members are threaded together, these two 45-degree lateral shoulders axially compress the conical sleeve. Because of the angle of only about 20 degrees on the sleeve, this sleeve is crushed radially inwardly to seal against the outer surface of the tube and the outer conical surface seals with the annular shoulder in the second fitting member. This type of fitting has been used for many years, as one example, on a gasoline line to an automobile carburetor.

A second prior art fitting utilized a flared end on the tubing, as exemplified by U.S. Pat. No. 3,195,936.

A third form of prior art is shown in U.S. Pat. No. 3,765,708 with a pair of annular beads at the end of the tube. However, these are caused by an inward crushing of an outer sleeve at annular places between the beads.

A fourth type of prior art is exemplified by U.S. Pat. No. 2,779,279, wherein an explosive force is utilized to expand portions of the tubing into an outer coupling sleeve.

A fifth type of prior art is exemplified by U.S. Pat. No. 1,961,453, which was stated to be an improvement on the first-mentioned prior art form. In this patent, the conical shape of the prior art separate sleeve was replicated on the tube wall itself. This, again, gives a large radially inward crushing force when the fitting is assembled.

The first-mentioned prior art patent has the disadvantage that the separate parts are easy to be misplaced and lost, the production variation in the size of the tubes means that the sleeve often fits either tightly or loosely, and if the coupling is overtorqued, the sleeve can dig into the tubing sufficiently that the tube will break easily upon vibration. Also, it is so deformed once tightened that it cannot be taken off and used on another tube.

The fifth-mentioned prior art patent has the disadvantage that the high radially inward force still tends to crush the tube when the fitting is assembled, and even with a double-walled tube, this tendency is still present.

SUMMARY OF THE INVENTION

The problem to be solved, therefore, is how to construct a tube fitting assembly which avoids the difficulties of the prior art, and which will provide a fluidtight seal not only with newly designed fitting members but also with existing fitting members and will permit many disassemblies and reassemblies, yet effectively sealing each time.

This problem is solved by a tube fitting assembly comprising, in combination, a tube and first and second interengageable threaded fitting members, said assembly comprising a first outwardly deformed area of the tube wall near one end of said tube, a second outwardly deformed area of said tube wall outboard of said first deformed area, an annular bead as part of said second deformed area, a U-shaped portion of said tube wall between said first and second deformed areas to establish with said first and second deformed areas four lateral portions of the tube wall spaced longitudinally from each other, said first threaded fitting member surrounding said tube and having a radially inwardly extending first shoulder inboard of said first and second deformed areas, said second threaded fitting member having an annular second shoulder, and the end of said tube sliding inside said second threaded fitting member, whereby as the first threaded fitting member is threaded into engagement with said second threaded fitting member the annular second shoulder of said second threaded fitting member abuts said annular bead to axially compress said four lateral portions between said first and second shoulders to thus seal the fitting assembly against leakage of fluid pressure.

The problem is further solved by a tube fitting comprising, in combination, a tube and a first threaded fitting member with a lateral first shoulder and adapted to threadably coact with a second threaded fitting member having a lateral annular second shoulder, said tube fitting comprising a first outwardly deformed area of the tube wall near one end of said tube, a second outwardly deformed area of said tube wall outboard of said first deformed area, an annular bead as part of said second deformed area and extending at about 60 degrees relative to the longitudinal axis of said tube, a laterally inwardly U-shaped portion of said tube wall between said first and second deformed areas, said first threaded member surrounding said tube, and the end of said tube adapted to be received inside the second threaded member, whereby as the first threaded member is threaded into engagement with the second threaded member the annular second shoulder of the second threaded member is abuttable with said annular bead to axially compress said first and second deformed areas between the first and second shoulders to thus seal at said annular bead against leakage of fluid pressure.

The problem is still further solved by a tube structure adapted for use with first and second threaded fitting members having laterally extending first and second shoulders, respectively, said tube structure comprising a first outwardly deformed area of the tube wall near the end of said tube, a second outwardly deformed area of the tube wall outboard of said first deformed area and including an outwardly extending annular bead of said tube wall, a laterally inwardly U-shaped portion of the tube wall between said first and second deformed areas, said annular bead extending at about 60 degrees relative to the longitudinal axis of the tube, and said annular bead and said first outwardly deformed area adapted to be engaged with longitudinal force by the second and first shoulders of the fitting members which tends to compress axially together said first and second deformed areas and to form a fluidtight seal between said annular bead and the second shoulder.

The problem is further solved by the method of making a tube fitting assembly with first and second interthreadable fitting members and a tube, said method comprising grasping a portion of said tube axially spaced from an end of said tube, axially contracting the tube between said portion and said end to form from the tube wall a first outwardly extending deformed area near said one end of the tube and a second outwardly extending deformed area outboard of said first area, establishing an annular bead as part of said second deformed area, establishing said first threaded member surrounding said tube inboard of said first deformed area, and establishing a laterally directed first shoulder on said first member and a laterally directed annular second shoulder on said second member, whereby the interthreading of said first and second fitting members causes said first shoulder to act on said first deformed area and said annular second shoulder to act on and seal with said annular bead.

Accordingly, an object of the invention is to provide plural annular beads on the tube wall which may be axially contracted into mutual engagement to establish a seal with a second member.

DESCRIPTION OF THE PREFERRED EMBODIMENTS

Figure 1:
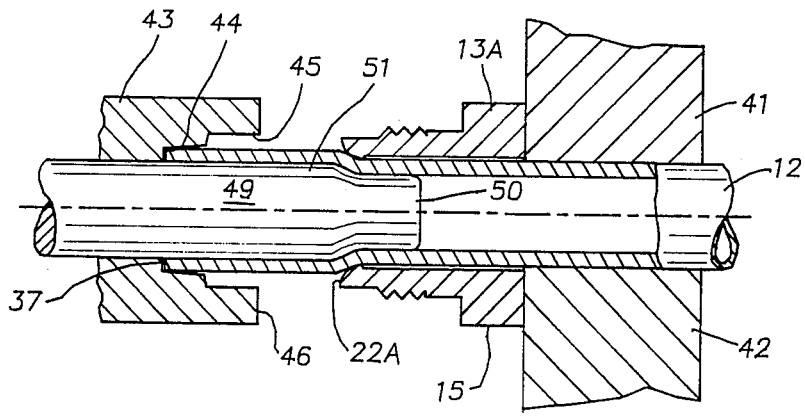
FIG. 1 is a longitudinal, sectional view of a method of sizing a tube.
Figure 2:
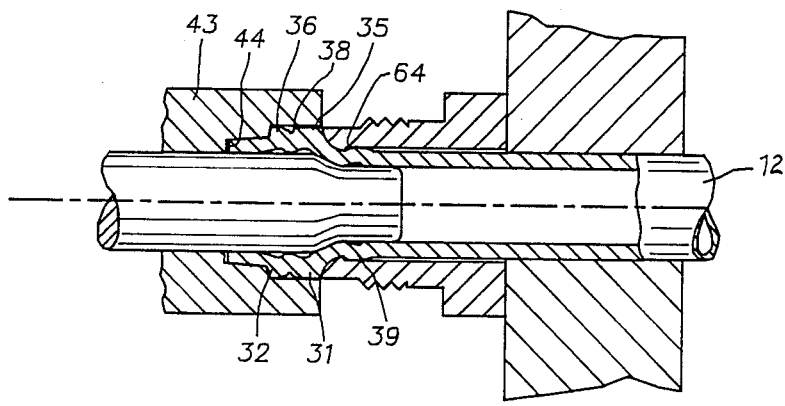
FIG. 2 is a longitudinal, sectional view of a method of forming plural beads on the tube.
Figure 7:
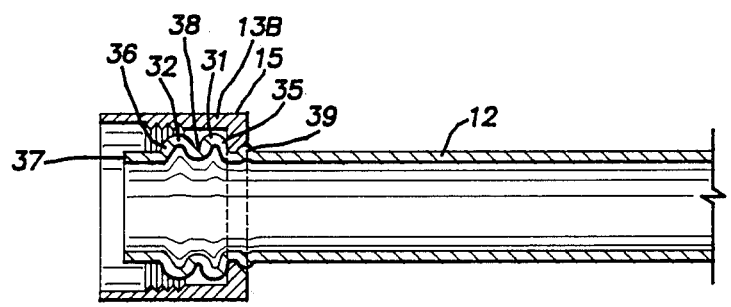
FIG. 7 is a longitudinal, sectional view of the formed tube and a female first fitting member before tightening.
Figure 8:
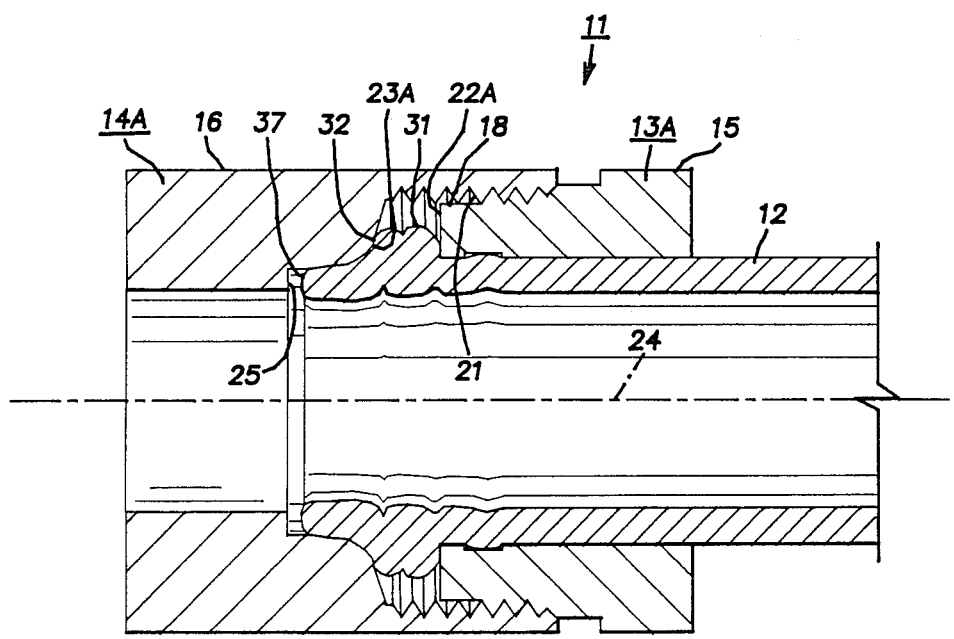
FIG. 8 is a longitudinal, sectional view of the assembled fitting members and tube.
Figure 9:
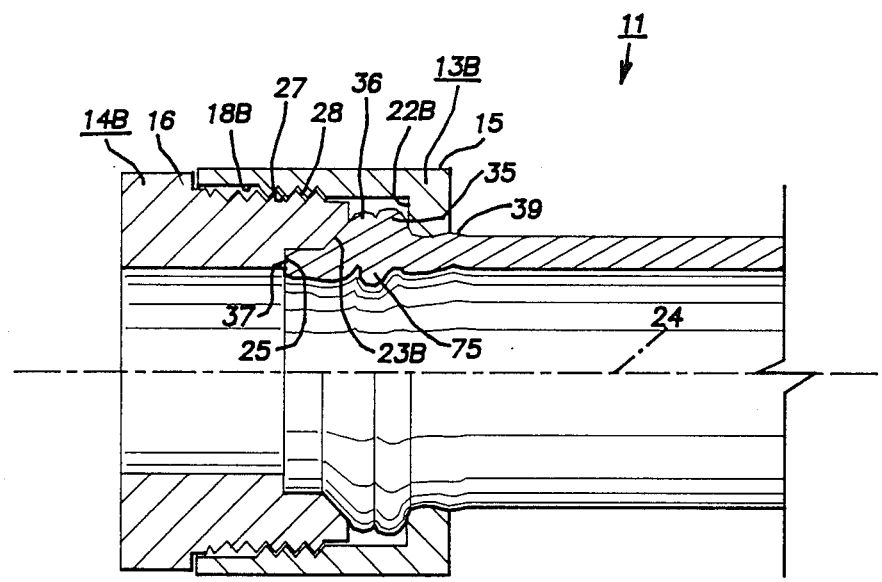
FIG. 9 is a similar longitudinal, sectional view of assembled fitting members and tube with increased torque.

The drawings show a tube fitting assembly 11 and the method of making this assembly, which includes generally, as shown in FIGS. 8 and 9, a tube 12 and first and second fitting members 13 and 14. The fitting members 13 and 14 are interengageable, and in the preferred embodiment are each threaded one with a male thread and one with a female threaded for interthreading engagement. The first fitting member 13A may have a male thread, as shown in FIGS. 1, 2, and 8, or may be a female thread fitting member 13B, as shown in FIGS. 7 and 9. The first fitting member 13 may have any of the usual means for actuation by a tool, such as a hexagonal wrench pad 15 and, similarly, the second fitting member 14 also has provision for operation by a tool, again, as an example by the hexagonal wrench pad 16.

With respect to the first fitting member 13A shown in FIGS. 1, 2, and 8, male threads 17 are provided on the first threading member 13 and a lead-on portion 18 is provided at the entrance end of this fitting, which may be cylindrical or generally cylindrical, to provide an axial alignment means to lead into the female threads 21 of this second fitting member 14A. This alignment means substantially aligns the two fitting members 13 and 14 so that a power wrench may be used to tighten together the two fitting members without any preliminary manual threading of the first fitting member. The first fitting member 13A has a lateral shoulder 22A on the forward end thereof, and the second fitting member 14A has a lateral shoulder 23A. The second fitting member 14A may be a standard fitting as used in the prior art, and as normally used with a separate sleeve or ferrule which has two conically tapered end portions and which encircles but is separate from the tube. Such ferrule might have two ends each at an angle of about 15 or 20 degrees relative to the axis of the tube, and it normally cooperates with the lateral shoulder 23A. Accordingly, the prior art lateral shoulder is typically at a 45-degree angle relative to the axis 24 of the tube. The second fitting member 14A also typically has a shoulder 25 as a stop for advancing movement of the tube 12.

Figure 6:
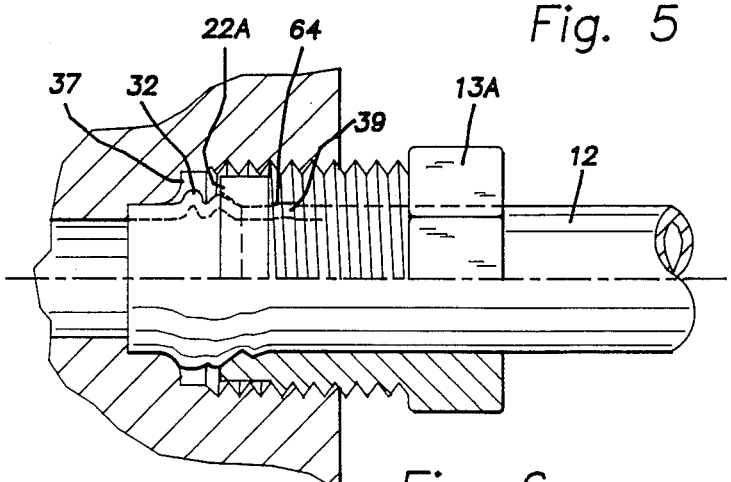
FIG. 6 is a longitudinal, sectional view of a tube and a first fitting member before tightening.

When the male and female threads are reversed in their position on the fitting members, as shown in FIGS. 7 and 9 relative to FIGS. 2, 6, and 8, the nut 13B has female threads 27 to engage male threads 28 on the second fitting member 14B. The generally cylindrical lead-on portion 18B is provided on the nut 13B, as is the lateral first shoulder 22B. The second fitting member 14B has the lateral shoulder 23B, which is typically at a 45-degree angle relative to the tube axis 24, whereas the lateral shoulder 22B is preferably at about a 90-degree angle relative to this axis.

Figure 5:
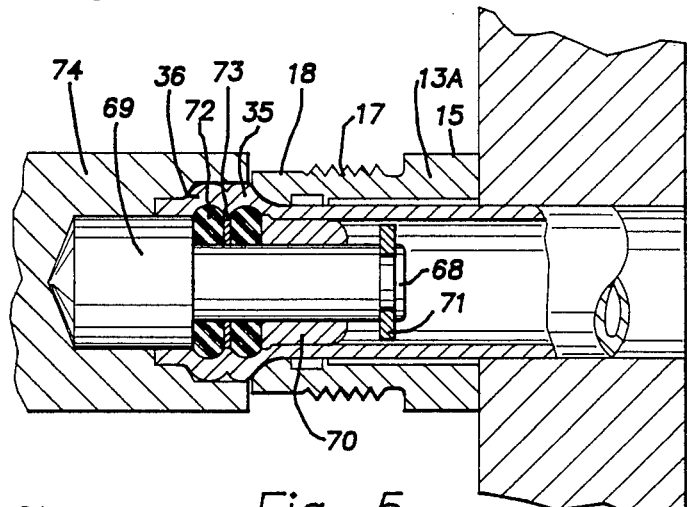
FIG. 5 is a longitudinal, sectional view of a still further embodiment.

A tube fitting assembly 11 in FIGS. 8 and 9 is shown in the completely assembled condition. FIGS. 2 and 5 show the tubing with a plurality of annular beads 31 and 32 prior to interconnecting the two fitting members 13 and 14, and FIGS. 6 and 7 show the tubing with the two fitting members before tightening.

The tube 12 is provided with first and second deformed areas 35 and 36, respectively. The second deformed area is closest to the end 37 of the tube 12, i.e., it is outboard of the first deformed area 35. Both deformed areas are deformed outwardly and the first and second annular beads are a part of these deformed areas. A generally U-shaped, annular portion 38 lies between and joins the annular beads and all of these deformed areas are formed from the wall of the tubing 12. A keeper bead 39 is provided inboard of the first fitting member 13B in order to retain this fitting member in position near the end 37 of the tube 12. This keeper bead 39 establishes the first lateral shoulder 22B as being adjacent the first deformed area 35. This first deformed area is not necessarily but is preferably an annular outwardly deformed area, and the shoulder 22B is preferably an annular shoulder on the first fitting member 13B.

FIG. 1 illustrates the preferred method of forming the plurality of annular beads on the tube 12. In the case of FIG. 1, this is illustrated with the male type of first fitting member 13A. Clamping jaws 41 and 42 have generally semicylindrical inner surfaces to grasp the outer periphery of the tube 12 at a predetermined location from the end 37 of the tube. The first fitting member 13A is slipped over the end of the tube up to the face of the jaws 41 and 42. A die 43 is used to provide an axial compressive force on the end of the tube. This die has a shoulder 44 to engage the end of the tube and a radial recess 45 adjacent the front face 46 of the die.

A sizing punch 49 is provided coaxially inside of the die 43, and has a nose portion 50 plus an enlarged portion 51. The sizing punch 49 may slide within the die 43 to a limited extent.

Figure 3:
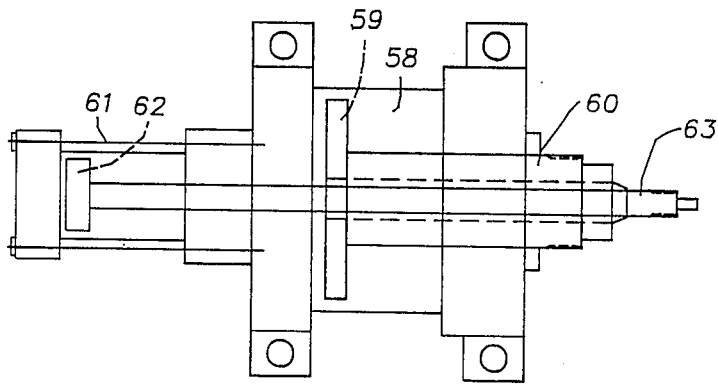
FIG. 3 is a plan view of a dual fluid cylinder assembly.

FIG. 3 shows a main fluid cylinder 58 containing a main piston 59 actuating a hollow piston rod 60. Also a piggyback cylinder 61 contains a piston 62 to actuate an internal piston rod 63. FIG. 3 shows the internal piston rod 63 with provision to actuate the sizing die 49 in advancing and retracting movements. The main piston rod 60 may connect to the die 43 for advance and retract movements of this die.

The method of forming the tube fitting includes advancing the sizing punch 49 by means of the piggyback piston 62 and the enlarged portion 51 sizes the tube 12 up to about the entrance of the first fitting member 13A, as shown in FIG. 1. Commercially produced tubing has a range of inside and outside diameters, and therefore this sizing punch 49 creates a uniform diameter of the tubing for subsequent operations.

Next, the die 43 is advanced by the main piston 49 until the front face of the die 46 is aligned with the end of the first fitting member 13A, FIG. 2. During this movement, the die shoulder 44 engages the end 37 of the tube and axially contracts a portion of the tube to create the plurality of deformed areas 35 and 36. This may be two or more, and two such deformed areas have been found to be a preferred structure. By this axial contraction, the tube is configured as shown in FIGS. 2, 6, and 7, with the first and second deformed areas 35 and 36 which include the first and second annular beads 31 and 32, respectively. Also, the U-shaped portion 38 is provided at this time and, as shown in FIG. 6, this provides four laterally directed portions of the tubing wall which are all spaced apart from one another, yet unitarily joined. Also, this axial contraction of the tube may be used to provide a keeper bead 39 to retain the first fitting member 13 in position. When the first fitting member is a male member, as shown in FIG. 1, this keeper bead may be established inboard of a keeper shoulder 64 near the front end or first shoulder 22A. This keeps the first fitting member 13A in position close to the end 37 of the tube.

Figure 4:
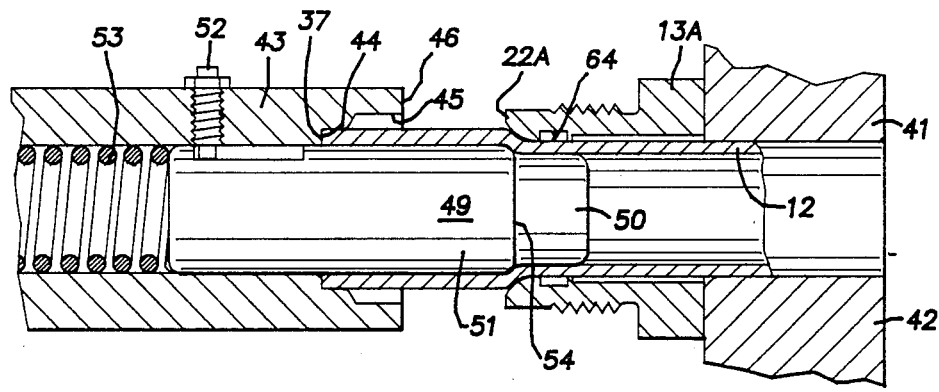
FIG. 4 is a longitudinal, sectional view of an alternate method.

FIG. 4 shows an alternative method of establishing the first and second deformed areas 35 and 36. No piggyback cylinders are used, but only a single cylinder and piston to move the sizing punch 49. Punch 49 may slide within the die 43, as limited by a screw 52. The initial forward movement of the punch 49 sizes the end of the tubing until the punch shoulder 54 is at the first shoulder 22A of member 13A. This is the condition shown in FIG. 4. Further advancing movement of die 43 compresses a spring 53 in a cavity on the die 43, and the plural deformed areas 35 and 36 are formed as in FIG. 2. The tube is now ready for insertion into the second fitting member 14A and initially interthreaded, as shown in FIG. 6.

FIG. 5 shows a still further method of establishing the first and second deformed areas 35 and 36. In this case, a central rod 68 and is on the forward end of a sizing punch 69. A sizing head 70 may slide on this central rod 68 and is retained thereon by a retaining ring 71. Between the sizing head 70 and the sizing punch 69, a plurality of die rubber washers 72 with separating shims 73 is provided. The sizing punch 69 is coaxially inside of a die 74. A single piston and cylinder will move the sizing head 70 into the tube to slightly enlarge the tube to a uniform size. Then the die 74 may be advanced further by the piston, and this will axially contract the tube so that the tubing wall forms a plurality of outwardly deformed areas. The die rubber washers 72 will be axially compressed so as to radially expand and help form, in this case, the first and second deformed areas 35 and 36. In all of the cases of FIGS. 2, 4, and 5, the deformed areas 35 and 36 are established with at least a second annular bead 32 extending at about a 60-degree angle relative to the axis 24.

FIGS. 8 and 9 show the tube fitting assembly 11 when the fitting members 13 and 14 have been interthreaded to exert a longitudinal compression force on the deformed areas 35 and 36. First, with respect to FIG. 8, as the first fitting member 13 is inserted into the second fitting member 14A, the lead-on portion 18 helps to align the two fitting members to be substantially coaxial so that no cross-threading will occur, but instead a power wrench may be applied to the first fitting member 13A without any need to first hand-thread this fitting member into the second fitting member 14A. Also, only a small amount of rotation of the first fitting member 13A is required, e.g., one-and-a-half to two turns after the shoulder 22A engages the bead 31. This interthreading of the two fitting members causes the first lateral shoulder 22 to engage the first deformed area 35 and move it towards the second lateral shoulder 23A on the second fitting member 14A. As a result, the second annular bead 32 engages the second lateral shoulder 23. With the preferred construction of the first lateral shoulder 22A being at about a 90-degree angle and the usual prior art shoulder 23A at about a 45-degree angle to the axis, the axial compression causes all four annular portions to be compressed into mutual engagement, i.e., each lateral portion is compressed so as to be contiguous to the next adjacent portion or portions. Also, the fact that the first shoulder 22A is generally at right angles to the axis means that the first annular bead 31 is pushed axially and without much tendency to collapse radially inwardly. The second shoulder 23A being at about a 45-degree angle, establishes not only an axial component on the second annular bead 32, but also a radially inward compressive force so that this bead is forced somewhat inwardly relative to the first annular bead 31.

FIG. 8 shows the fitting assembly 11 with about a normal amount of torque applied by the interthreading of the fitting members 13 and 14. Accordingly, the end 37 of the tube may not be pressed against the shoulder 25 on the second fitting 14A. Nevertheless, the seal which will hold fluidtight pressure of 200 psi, for example, is established between the second shoulder 23 on the fitting 14A and the second annular bead 32.

FIG. 9 illustrates the other type of fitting with a female first fitting member 13B and male second fitting member 14B. The first and second deformed areas 35 and 36 are still present, but in this case are shown as being compressed axially to a greater extent such that the end 37 of the tube engages the shoulder 25. This might be the condition with considerable overtorqueing of the two fitting members or, alternatively, the repeated disassembly and reassembly of the tube fitting assembly 11, each time tightening the two fitting members together a little tighter. This is a great advantage of the present invention in that the plural deformed areas have a longer axial length initially, as shown in FIGS. 6 and 7, and therefore this longer axial length can take a greater or lesser amount of axial contraction and still establish the fluidtight seal at the annular bead 32 and second shoulder 23A or 23B. In FIG. 9 the radially inward bulge 75 of the tube is slightly greater than in FIG. 8 because of the greater axial compression.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A tube fitting assembly comprising, in combination, a tube and first and second interengageable threaded fitting members, said assembly comprising:
   a first outwardly deformed area of the tube wall near one end of said tube;
   a second outwardly deformed area of said tube wall outboard of said first deformed area;
   an annular bead as part of said second deformed area;
   a U-shaped portion of said tube wall between said first and second deformed areas to establish with said first and second deformed areas four lateral portions of the tube wall spaced longitudinally from each other;
   said first threaded fitting member surrounding said tube and having a radially inwardly extending first shoulder inboard of said first and second deformed areas;
   said second threaded fitting member having an annular second shoulder at an acute angle to the longitudinal axis of the tube with the acute angle facing said second outwardly deformed area; and
   the end of said tube sliding inside said second threaded fitting member, whereby as the first threaded fitting member is threaded into engagement with said second threaded fitting member the annular second shoulder of said second threaded fitting member abuts said annular bead to axially compress said four lateral portions between said first and second shoulders and to radially inwardly compress said annular bead with the resistance to radially inward compression to establish a seal between said tube and the second fitting member against leakage of fluid pressure.

2. A tube fitting assembly as set forth in claim 1, wherein said first deformed area includes a second annular outwardly extending bead.

3. A tube fitting assembly as set forth in claim 2, wherein said U-shaped portion includes an inwardly directed annular groove between said first and second annular beads.

4. A tube fitting assembly as set forth in claim 1, including means aiding axial alignment of said first and second threaded members.

5. A tube fitting assembly as set forth in claim 4, wherein said alignment means includes a cylindrical portion of said tube between the end of the tube and said second deformed area.

6. A tube fitting assembly as set forth in claim 4, wherein one of said threaded fitting members is male and the other is female; and
   wherein said alignment means includes cylindrical portions on each of said male and female threaded fitting members.

7. A tube fitting assembly as set forth in claim 1, including a radially inwardly extending flange on said first threaded member forming said first shoulder.

8. A tube fitting comprising, in combination, a tube and a first threaded fitting member with a lateral first shoulder and adapted to threadably coact with a second threaded fitting member having a lateral annular second shoulder, said tube fitting comprising:
   a first outwardly deformed area of the tube wall near one end of said tube;
   a second outwardly deformed area of said tube wall outboard of said first deformed area;
   an annular bead as part of said second deformed area and extending at about 60 degrees relative to the longitudinal axis of said tube;
   a laterally inwardly U-shaped portion of said tube wall between said first and second deformed areas;
   said first threaded member surrounding said tube; and
   the end of said tube adapted to be received inside the second threaded member, whereby as the first threaded member is threaded into engagement with the second threaded member the annular second shoulder of the second threaded member is abuttable with said annular bead to axially compress said first and second deformed areas between the first and second shoulders and to radially inwardly compress said annular bead with the resistance to radially inward compression to establish a seal between said tube and the second fitting member against leakage of fluid pressure.

9. A tube fitting as set forth in claim 8, wherein said assembled fitting has plural portions of said tube wall axially compressed into mutual engagement.

10. A tube fitting as set forth in claim 8, including an annular bead as part of said first deformed area.

11. A tube fitting as set forth in claim 10, including said U-shaped portion of the tube wall being annular and between said first and second-mentioned annular beads.

12. A tube fitting as set forth in claim 11, wherein said assembled fitting has four annular portions of the tube wall, including the two annular beads and the U-shaped portion, compressed into mutual engagement.

13. A tube fitting as set forth in claim 10, wherein said first lateral shoulder engages said annular bead in said first deformed area at about 90 degrees to the longitudinal axis of the tube to compress same in a substantially longitudinal direction.

14. A tube structure adapted for use with first and second threaded fitting members having laterally extending first and second shoulders, respectively, said tube structure comprising:
   a first outwardly deformed area of the tube wall near the end of said tube;
   a second outwardly deformed area of the tube wall outboard of said first deformed area and including an outwardly extending annular bead of said tube wall;
   a laterally inwardly U-shaped portion of the tube wall between said first and second deformed areas;
   said annular bead extending at about 60 degrees relative to the longitudinal axis of the tube; and
   said annular bead and said first outwardly deformed area adapted to be engaged with longitudinal force by the second and first shoulders of the fitting members which tends to compress axially together said first and second deformed areas and the about 60 degree angle of the annular bead causing radially inward compression of said annular bead with the resistance to radially inward compression establishing a fluid-tight seal between said annular bead and the second shoulder.

15. A tube fitting assembly as set forth in claim 14, wherein said tube is of metal.

16. A tube structure as set forth in claim 14, including first and second annular beads in said first and second deformed areas, respectively.

17. A tube structure as set forth in claim 16, wherein said U-shaped portion is annular for a total of four lateral annular portions of said tube wall.

18. A tube structure as set forth in claim 17, wherein said four lateral annular portions are initially longitudinally spaced and in the fluidtight seal condition are longitudinally compressed tightly together.

* * * * *